(12) United States Patent
Kohut

(10) Patent No.: US 6,246,769 B1
(45) Date of Patent: Jun. 12, 2001

(54) AUTHORIZED USER VERIFICATION BY SEQUENTIAL PATTERN RECOGNITION AND ACCESS CODE ACQUISITION

(76) Inventor: Michael L. Kohut, 484 Aptos Creek Rd., Aptos, CA (US) 95003-3950

( * ) Notice: Subject to any disclaimer, the term of this patent is extended or adjusted under 35 U.S.C. 154(b) by 0 days.

(21) Appl. No.: 09/512,419

(22) Filed: Feb. 24, 2000

(51) Int. Cl.[7] .................................................. H04K 1/00
(52) U.S. Cl. ............................. 380/45; 380/46; 713/159; 713/166
(58) Field of Search ......................... 380/45, 46; 705/56, 705/65, 72; 713/159, 166

(56) References Cited

U.S. PATENT DOCUMENTS

| | | | |
|---|---|---|---|
| 4,016,404 | * 4/1977 | Appleton | 235/61.7 |
| 4,926,481 | * 5/1990 | Collins, Jr. | 380/25 |
| 5,239,583 | 8/1993 | Parrillo | 380/23 |
| 5,251,259 | 10/1993 | Mosley | 380/23 |
| 5,513,250 | 4/1996 | McAllister | 379/91 |
| 5,742,035 | * 4/1998 | Kohut | 235/380 |
| 5,850,442 | * 12/1998 | Muftic | 380/21 |

* cited by examiner

Primary Examiner—Thomas R. Peeso
Assistant Examiner—Todd Jack

(57) ABSTRACT

A system that eliminates the use and recall of multiple dedicated access codes to verify an authorized user across multiple protected resources. Fixed access codes selected by a user, or issued to a user, such as Personal Identification Numbers (PINs), passwords and passcodes are replaced by temporary codes that are valid only for the specific transaction in progress. A temporary code is randomly selected by the system and displayed to the user encoded within a completely filled geometric matrix along with other non-code characters. The user must recall a single, predetermined sequential pattern within said matrix in order to obtain the access code. Once the code is obtained, or decoded from the matrix, the user must enter that code into the system. If the entered code matches the transaction specific code in system memory, access to the protected resource is granted and the transaction is allowed to proceed.

3 Claims, 5 Drawing Sheets

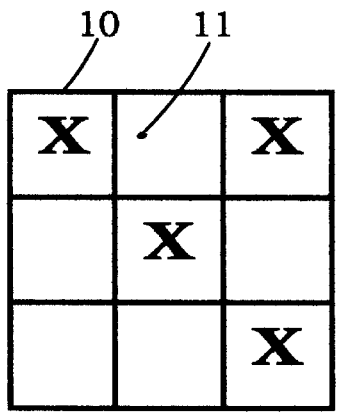
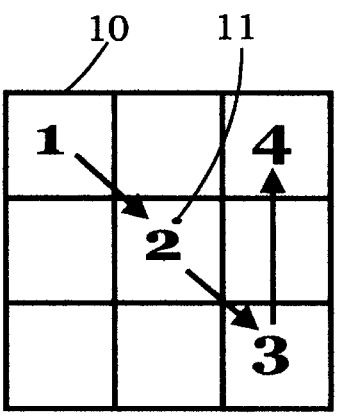
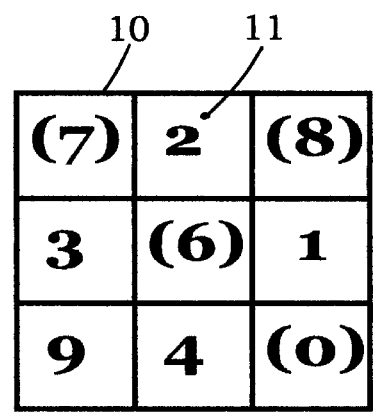
FIG. 3A     FIG. 3B     FIG. 3C
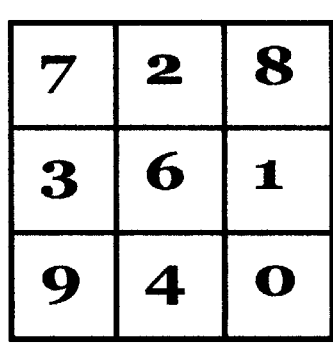
FIG. 3D

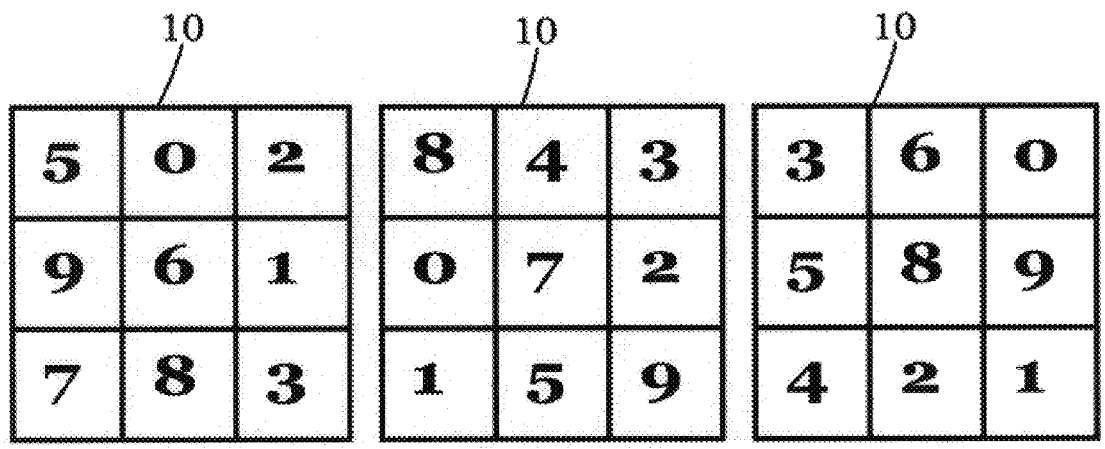
FIG. 4A  FIG. 4B  FIG. 4C
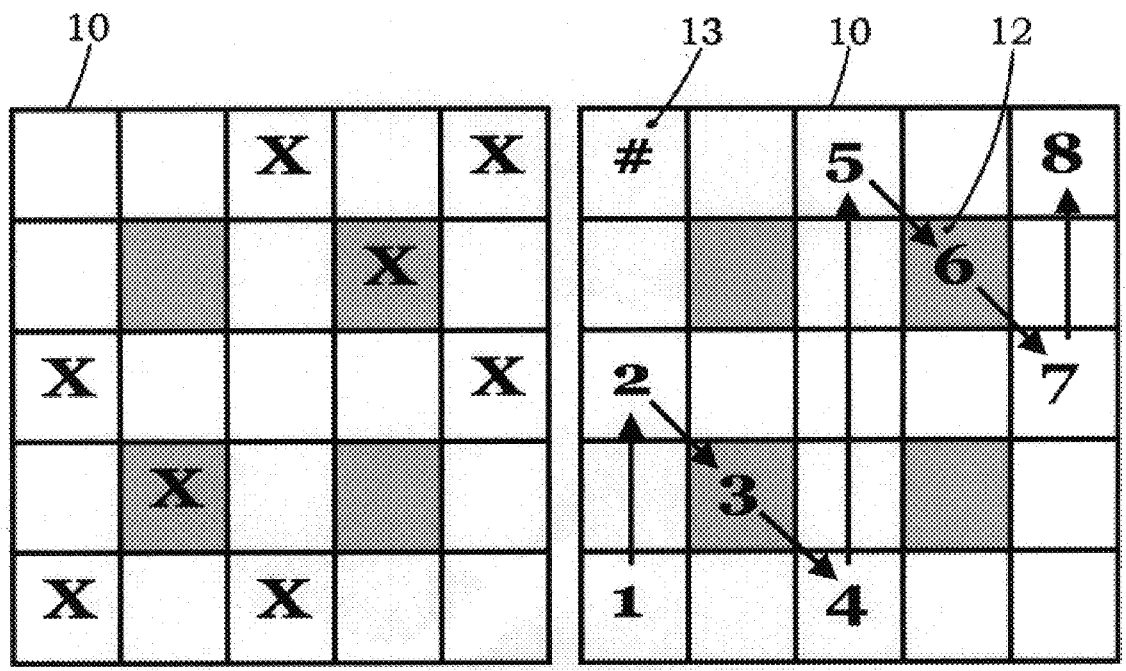
FIG. 5A  FIG. 5B

US 6,246,769 B1

AUTHORIZED USER VERIFICATION BY SEQUENTIAL PATTERN RECOGNITION AND ACCESS CODE ACQUISITION

CROSS REFERENCE TO RELATED APPLICATIONS

Disclosure Document Program: 465535 Nov. 23, 1999.

BACKGROUND

1. Field of Invention

This invention relates to bank cards, credit cards, debit cards, smart cards, communication cards, financial transaction cards, student cards, employee cards, medical cards, identification cards and any other card based system that requires an authorized user to recall and enter a code in order to gain access to a protected resource, information source or service. This invention is also related to non-card based systems such as Internet and Intranet access codes, computer codes, alarm codes, lock codes, wireless codes or any other non-card based code which requires an authorized user to enter a code in order to gain access to a protected resource, information source or service.

2. Description of Prior Art

As computers have become more predominant in everyday life, it becomes evident that business in the near future will be transacted, in a larger part, on the electronic superhighway or the Internet. The convenience of shopping the Internet and the utilization of e-commerce has already begun to permeate our lives. Credit card transactions and product orders on the Internet are now commonplace. However, along with this newfound convenience, system security, user identification, and validation of user identification remain legitimate and primary concerns for users of the current systems.

The immediate solution to these security issues and concerns is the multitude of PIN codes, passwords and passcodes that have been issued to secure the totality of our protected resources. In other words, Internet and credit card users are becoming overwhelmed with well-intended security codes. Even though passcodes (passwords which do not form recognizable words) are extremely secure, attempts to recall a meaningless jumble of upper and lower case characters is unrealistic and impractical for most users. The avalanche of PINs, passwords and passcodes has become so crushing that many users often breach the intended security by writing these codes in convenient places which are easily available to both the authorized and unauthorized user.

In today's marketplace, four requirements are paramount in granting access to an authorized user of a protected resource: (1) authorized user identification, (2) verification of authorized user identification, (3) unauthorized user access rejection and (4) an appropriate level of security to protect the resource from unauthorized use. For example, when a user (authorized or unauthorized) wishes to withdraw funds from an Automated Teller Machine (ATM), a bank card is inserted into the ATM and the "card" is identified via data transferred from a magnetic strip or an electronic chip within the card to a system database. To verify that the user is the authorized user of the bank card inserted into the ATM, the ATM prompts the user to enter a Personal Identification Number (PIN) which is only issued to the authorized user by the grantor of the bank card. If the PIN entered by the user is identical to the PIN issued to the authorized user and also recorded in system database memory, the user is verified as the authorized user and the transaction is allowed to proceed. The security afforded by this transaction involves possession of the bank card issued to the authorized user, knowledge of the PIN code, an upper limit cash demand and card deactivation if a consecutive series of incorrect PINs are entered into the ATM system. Theoretically, this security system is adequate to prevent an unauthorized user from gaining access to an account, but unfortunately, unauthorized access to protected resources has become a billion dollar problem. The resolution of this problem lies in understanding the weaknesses of the present systems and how to effectively eliminate those weaknesses while simultaneously maintaining simplicity, security and efficiency.

As the PIN system of security became the standard for verification of an authorized user in both card and non-card based systems, authorized users were subsequently required to recall a plurality of PIN codes in order to gain access to protected resources and services. This problem of excessive recall was resolved on the user level by recording PIN codes in writing and carrying a copy for easy reference in a wallet or purse. However, this was a direct compromise of the intended security afforded by the PIN system and could result in easy unauthorized access to related accounts if the wallet or purse was stolen. The recall problem was addressed on the grantor level by allowing the use of personalized PINs. In this way, an authorized user could eliminate recalling a multitude of PIN codes by making all PIN codes identical. In other words, personalized PINs allowed an authorized user to utilize a single PIN code for all protected resources, and additionally, a PIN of personal choice. However, if the personalized PIN was easy to guess, such as the authorized user's birth date or phone number, an informed unauthorized user could gain access to all protected resources with a single intelligent guess. Today, the major disadvantage of personalized PINs is the requirement of identical code lengths with constant and unchanging characters, usually numerals. If unauthorized use of a resource is obtained by observing the PIN entry of the authorized user, said unauthorized user instantly gains access to all resources protected by said personalized PINs. Therefore, personalized PINs decrease the personal security of the authorized user due to the possible windfall associated with gaining unlawful possession of the authorized user's wallet or purse and subsequent access to all resources protected by personalized PINs. Gaining access to the Internet and e-commerce environments with an increased level of security has changed access code requirements with respect to code length and the alphanumeric mix of code characters. Since many internet sites now require access codes of eight or more characters with a minimum of two numerals, or instead issue a code of their choosing of varied lengths, personalized PINs only resolved the excess PIN memory overload problem for a short period of time.

With the advent of the Internet and e-commerce, the security level intended by the four digit PIN code system was inadequate for the computer based environment and became obsolete overnight. PIN codes were replaced by passwords, or words in the authorized user's native language that were of sufficient length to increase security and that could be easily recalled. The password system increased the level of security, but eventually users were forced to record their passwords near the computer to avoid confusion with other passwords associated with a multitude of other applications and protected resources. The plurality of PINs, from the not so distant past, was replaced with a plurality of passwords. However, this new problem of too many passwords was resolved with software that allowed an authorized user to conveniently record their user log-on names and passwords in computer memory for automatic submission to the protected application or resource. However, if the computer was stolen or sold without erasing the codes, it became easy for an unauthorized user to gain access to all protected resource codes held in computer memory. Additionally, if an authorized user traveled on business and needed to use a protected resource which required the entry of an access code, and that code was only recorded in the memory of a home based computer, the user would be unable to gain access to that resource unless the correct code could be recalled. In other words, security was compromised for convenience and accessibility when codes were recalled by internal computer software.

Computer passwords have been replaced with passcodes that contain both numeric and alpha characters forming a non-word of an adequate length. This greatly increases the level of security, but if the highly secure passcodes are logged into computer memory for automatic submission as mentioned previously, the intended security level is also potentially diminished.

There are a multitude of examples depicting the limitations associated with human memory, code recall, and maintaining the intended level of security. Presently, there is no simple and effective system of authorized user verification with an adequate level of security to prevent unauthorized use, but attempts have been made to better the present systems with human limitations in mind.

Method and Apparatus for Improving Security Using a Access Codes, U.S. Pat. No. 5,239,583 by Parrillo is an attempt to increase system security by varying the four digit credit card PIN code in a predetermined sequence in order to thwart any attempt by an unauthorized user to obtain the PIN by observing the PIN key pad entry of the authorized user. Since the PIN entered by the authorized user was only valid for the transaction in progress, and since the PIN for the next transaction would be different, any attempt of unauthorized use by observing or recording the PIN and account number key pad entries of the authorized user would be in vain. This patent also utilized the standardized telephone key pad, and the accompanying alphanumeric designations, to aid in PIN recall. A four letter key word was chosen and referenced to the alphanumeric telephone key pad to aid in PIN recall. This type of mnemonic aid could become very complicated with multiple PINs requiring the authorized user to recall specific words for specific PIN codes. Security could be selectively increased by changing more than one numerical digit in the PIN as the code progressively changed in said predetermined sequence. However, to achieve increased security, the authorized user is required to recall complicated and unreasonable scenarios making the system highly impractical. Parrillo's patent did have some of the very important key features: transaction specific PINs that sequentially repeated and PIN code variation. My patent improves Parrillo's patent by requiring the authorized user to only recall a single sequential pattern to obtain a plurality of PINs from any standardized geometric configuration, eliminating the use of the alphanumeric telephone key pad, the associated key words as mnemonic aids, and elimination of complicated memory steps to increase security. Parrillo's invention uses complicated repeating sequences of PIN code numbers that must be recalled by the authorized user to increase system security at the expense of simplicity. A user must keep track of exactly how many times a plurality of cards and associated PINs have been used within a 24 hour period to maintain access to all accounts.

If a user forgets the complicated sequences or becomes confused, Parrillo's invention will prevent the authorized user from gaining access to their own protected resources, defeating the primary intention of authorized user access codes. My invention uses a single secret sequential pattern within a geometric matrix to recall all transaction specific PINs of varying code lengths across a plurality of protected resources. My invention provides a much greater level of security than Parrillo's invention by randomly changing PIN code characters and length within a single, unchanging sequential pattern. Parrillo's invention does not use sequential patterns or a geometric matrix and is not suited for the internet environment due to the underlying complicated nature associated with PIN code recall.

Telephone Based Credit Card Protection, U.S. Pat. No. 5,513,250 by McAllister is another attempt to increase PIN system security by permitting the authorized user to limit credit card or resource access by incorporating a specified set of temporary parameters such as time frame, geographical area, dollar limit and a temporary PIN into authorized user access requirements. In order for a transaction to proceed, all of the temporary parameter requirements specified by the authorized user had to first be satisfied. All temporary parameters were also to be defined on a per use basis by the authorized user. This system definitely increased PIN system security, but at the expense of the authorized user's time and energy. Since McAllister's patent required the authorized user to satisfy all predefined temporary parameter limits prior to card use, the proposed system is both very impractical and inconvenient. However, McAllister, like Parrillo, did propose the use of a temporary PIN to increase system security. My patent improves on McAllister's patent by requiring no authorized user involvement or inconvenience to enhance system security when using a credit card or accessing a protected resource on a use-by-use basis. McAllister's patent does not utilize a geometric matrix or a sequential pattern to recall PIN codes, and therefore, must rely upon the unreliable capabilities of human memory.

Personal Identification System, U.S. Pat. No. 5,251,259 by Mosley is a patent that increases system security by varying a three or four digit PIN with respect to the day of the week, the number of card uses in a particular day, and an alpha word key to indicate which columns of numbers within a matrix held the valid PIN. This system requires the use of a matrix decoder to obtain the correct PIN codes. If the authorized user were to lose the decoder or forget how many times the card was used in a particular day, even the authorized user could not gain access to the protected resource. Mosley's patent increased system security by making PIN recall extremely complicated and dependent upon possession of a decoding device. However, Mosley did have a clear vision of the problem of insufficient system security, and once again, resolved the problem by variation of the PIN. My patent improves Mosley's patent by incorporating a much higher level of security without requiring the authorized user to carry a decoding device and the associated complications of decoding a simple three or four digit PIN code. Also, my patent does not require the authorized user to remember how many times a particular protected resource has been accessed in order to properly decode the correct PIN. Mosley's invention uses a static geometric matrix where all matrix numerals are fixed and not capable of changing, and where no sequential pattern is utilized within said matrix. Mosley's matrix is index by the alpha abbreviations of the days-of-the-week at the top of the matrix and alpha characters at the bottom of the matrix. The visible character sequence of "S-M-T-W-T-F-S" is an indication to an unauthorized user that knowledge of the day-of-the-week is involved in the decoding process, which in itself lowers the overall security level of Mosley's invention. The numerals within Mosley's matrix are optimized to a range of 1 to 7 which correspond to the number of PIN code uses within a particular day. If the numerals within the matrix were increased to 10, the size of the Mosley's card containing the matrix would have to increase in size, or the print font would have to become smaller, and the authorized user would be required to keep track of a possible increased number of PIN code uses. The alpha characters at the bottom form a secret word or alpha character set used to decode the PIN. Also, Mosley's invention must use a different matrix card for each and every protected resource, requiring the authorized user to carry a plurality of Mosley matrix cards. Therefore, Mosley's invention requires an authorized user to recall a secret character set, have knowledge of the day-of-the-week, keep track of how many different times a plurality of credit cards have been used within a set period of time, and have physical possession of all cards containing the Mosley matrix. These Mosley requirements complicate rather than simplify the process of recalling a PIN code with increased security. My invention uses a single unchanging sequential pattern within a geometric matrix requiring an authorized user to recall only said sequential pattern to recall a plurality of PIN codes across multiple protected resources. My invention does not require the authorized user to have knowledge of the day-of-the-week or how many times a specific protected resource had been accessed within any time period. My invention further improves Mosley's invention by having the ability to adjust system security as follows: 1) by changing all characters within the geometric matrix for each and every transaction, 2) by changing all characters within the secret sequential pattern in random and non-repeating fashion, 3) by having the capability to adjust PIN code length on a transaction-to-transaction basis, 4) by not revealing any part of the decoding method such as days-of-the-week, and 5) by not requiring the authorized user to carry an ancillary device which could possibly lower system security if possessed by a clever unauthorized user. Mosley's invention is also not compatible with use on the internet environment where passwords and passcodes are commonplace.

Memory Aiding Device for Credit Card PIN Numbers, U.S. Pat. No. 5,742,035 by Kohut, uses a secret sequential pattern within a standardized geometric matrix to recall an authorized user's dedicated PIN code. Kohut's patent is not capable of using transaction specific PIN codes, and therefore, can only recall the same fixed PIN code on all transactions. Kohut's preferred embodiment is an encoded geometric matrix label that attaches directly to the surface of a authorized user's credit card allowing the authorized user to recall that card's dedicated PIN. Kohut simplified code recall by using a single secret sequential pattern chosen by the authorized user to recall a plurality of different fixed PIN codes across different credit cards and protected resources. However, Kohut's patent could not vary PIN code characters or PIN code length within the secret sequential pattern, thus limiting system security. My patent improves Kohut's patent by eliminating the use of dedicated PIN codes, passwords and passcodes by substituting transaction specific codes only valid for the specific transaction in progress, and for a limited period of time. Also, my patent permits a much higher level of system security through a combination of available positions within the geometric matrix, code length, code time out, and the use of transaction specific codes which are random, and therefore, immune to observation attempts of unauthorized users.

Credit Card Verifier, U.S. Pat. No. 4,016,404 by Appleton uses apertures inserted into the surface of a credit card which contain a scrambler code, a check sum and the authorized user's PIN code to verify the authorized user. Appleton's invention uses a single dedicated PIN code and does not have the capability to change codes from transaction-to-transaction limiting the overall security of the Appleton system. If an unauthorized user had possession of the Appleton credit card and had knowledge of the PIN code, the security would be completely compromised. Appleton does utilize a matrix of apertures in his invention, but no sequential pattern containing a changeable transaction specific PIN code is utilized, rather Appleton's matrix contains a single fix PIN code. The advantage of the Appleton invention is that interrogation of the system database is not required to verify the PIN code of the authorized user. My invention greatly improves upon the Appleton invention 1) by utilizing transaction specific PIN codes that constantly change, 2) by maintaining system security even if an unauthorized user has possession of the authorized user's credit card, 3) and by having the capability to access protected resources on the internet without the use of a physical credit card.

Computer Access Security Code System, U.S. Pat. No. 4,926,481 by Collins uses a single or multi dimensional geometric matrix, but does not use a randomly chosen sequential pattern chosen by the authorized user within said matrix. The purpose of the Collins invention is not to gain access to a protected resource by entering a PIN code, but rather to gain access by entering the correct response to a transmitted character set which corresponds to opposing corners of a specific geometry. The user must provide the character set from an identical geometric matrix which defines the remaining two corners of the said specific geometry. However, both the user and the grantor of the protected resource must be in possession of the required identical geometric matrices and have knowledge of the specific geometry being utilized. Collins does not use a secret sequential pattern within a geometric matrix, but the perimeter of a specified geometry, such as a rectangle, to create a pattern without any defined sequence. The Collins invention uses either single or multiple sets of codes which are obtained from different geometric matrices to adjust the security level, thus requiring the authorized user to rely upon detailed documentation to gain access to the protected resource. My invention does not require documentation to either adjust the level of security or to change the code and does not require the authorized user to be knowledgeable of specified geometry perimeters which may change form time-to-time. My invention simplifies code recall by utilization of a single secret sequential pattern not tied to any specific geometry and not requiring multiple matrices to increase the level of security. Our two inventions (Collins and my invention) use similar items such a patterns, matrices and transitional codes, but these devises have been used within the art for many years. The difference lies in design, implementation and requirements for use.

Memory Aiding Device, U.S. Pat. No. 5,246,375 by Goede uses a card containing a primary matrix of numbers which is perimeter indexed on the "X" and "Y" axis by alpha numeric characters arranged in ascending order and used as matrix position locators. A recording means with a transparent secondary matrix overlays the primary matrix for the purpose of decoding a specific PIN code associated with a single specific protected resource. Once said recording means is properly positioned on the surface of the primary matrix by a specific user recalled index code, dedicated secondary matrix positions highlighted by color form a decoding pattern which is visible to both the unauthorized and authorized users. Each protected resource will utilize the same index locator code, but each will also be required to have a unique secondary matrix containing a different pattern to decode a different specific PIN code. My invention improves upon Goede's invention 1) by requiring no ancillary device in the possession of the authorized user to recall or decode a PIN code, 2) by requiring the authorized user to recall only a single secret sequential pattern to decode a plurality of PIN codes across a plurality of protected resources, 3) by greatly increasing the level of system security by use of transaction specific codes and altered code length and 4) by being conducive to the internet environment. Since Goede's invention may render the authorized user access to a protected resource non existent if the primary or secondary matrices are lost, relying on Goede's device during travel may place the authorized at considerable risk.

In summary, all of the patents mentioned above are primarily designed to increase the present level of system security associated with protected resource code recall, such as PIN codes, passwords and passcodes. In many cases, system security was increased at the expense of practicality. The true nature of the code recall problem is that human beings do not remember numbers, words or a combination of alphanumeric characters for any length of time unless some form of constant reinforcement is applied. The true resolution of this problem is not to use numbers or alphanumeric characters as codes to gain access to protected resources, but to use something much more user friendly to the human brain: sequential pattern recognition. For example, the notes of song form an audio sequential pattern, and recall is effortless even over extended periods of time, and a forgotten phone number is often recalled as one recalls the phone keypad and the sequence of numbers previously depressed.

SUMMARY OF INVENTION—OBJECTS AND ADVANTAGES

Note: From this point on, "PIN" will refer to PIN, PIN code, password and passcode as applicable.

The objects and advantages of my invention are as follows:

a) to provide a method of encoding and recalling an authorized user's PIN where no permanent or dedicated PIN is issued to an authorized user from a grantor of a protected resource;

b) to provide a method where it is not necessary for an authorized user to memorize or recall a dedicated PIN for the purpose of identification verification or to gain access to a protected resource;

c) to provide an authorized user with a method of recalling a plurality of transaction specific or temporary PINs, only valid for the transaction in progress, for the purpose of gaining access to a plurality of protected resources, by recognizing only a single sequential matrix pattern from a standardized geometric matrix;

d) to provide a method of varying PIN code length with the inclusion of a unique matrix position, separate from the authorized user's sequential matrix pattern containing the PIN code, to indicate the length of the PIN encoded within said sequential matrix pattern;

e) to allow an authorized user to readily decode PINs and gain access to any protected resource which has not been accessed by the user for an extended period of time;

f) to provide a grantor of a protected resource with a method of adjusting the level of security to adequately deter unauthorized use;

g) to eliminate the need for personalized PINs and the security problems associated with PINs chosen from birth dates, phone numbers, etc.

h) to eliminate the need for an authorized user to carry recorded PINs concealed in a purse or wallet increasing the level of both personal and PIN system security;

i) to increase the monetary intake level of a protected resource grantor with respect to an increase in transactions or resource usage;

j) to reduce a grantor's labor associated with personalized PIN account distribution, maintenance and re-informing authorized users of forgotten PINs;

k) to increase the ease-of-use and user friendliness of any protected resource transaction.

Further objects and advantages associated with my invention are the possibilities to provide users with a single standardized geometric matrix for decoding PINs of different lengths from a plurality of protected resources. This is a distinct advantage because credit card PIN codes, computer passwords or passcodes can all utilize a single standardized geometric matrix with adjustable security levels. The authorized user only needs to recall a single sequential matrix pattern and the location of the matrix position designating PIN length to gain access to all protected resources within a system. The level of system security can be adjusted by varying PIN length in a standardized geometric matrix of sufficient position size to adequately provide the security desired. This can be accomplished through the use of a centralized computer database in which the authorized user's personal and secret sequential matrix pattern resides. Grantors of card based systems, such as bank cards, credit cards, debit cards, smart cards and communication cards, and grantors of non-card based systems, such as Internet Service Providers, Internet Application Providers, financial transaction services and any protected resource on the Internet, could subscribe to this system service where dedicated PINs are eliminated and system security is adjusted to an appropriate level to deter unauthorized use and fraud on a transaction-to-transaction basis.

My invention differs from prior art as follows:

a) My invention utilizes sequential pattern recognition within a standardized geometric matrix to recall a transaction specific or temporary PIN code of variable length. My invention can accommodate PINs of different lengths by incorporating a unique geometric matrix position not associated with the authorized user's sequential matrix pattern to indicate PIN length. As PIN length is increased, system security is also increased. For example, a 5 by 5 geometric matrix could accommodate a 4 digit numerical PIN with a probability of guessing at 1 in 303,600 attempts, or an 8 digit alphanumeric PIN with a probability of guessing at 1 in 43,609,104,000. The security level afforded by the matrix greatly exceeds the natural probability of guessing correctly which is 1 in 10,000 and 1 in 100,000,000 respectively.

b) My invention eliminates dedicated PINs issued by a grantor of a protected resource, and therefore, does not require said grantor to issue a PIN to an authorized user for the purpose of gaining access to said resource. All prior art cited above require a grantor to issue a PIN or a progression of PINs to the authorized user. Said prior art then proceeds to encode that PIN or PIN progression as described by the invention.

c) My invention does not require the authorized user to memorize or recall any predetermined progression of PINs.

d) My invention does not require the authorized user to possess any ancillary secondary device to aid in PIN recall.

e) My invention can be used with any existing system which has a key pad or touch screen for PIN entry and which has the capability to display a geometric matrix of appropriate size. My invention is not the only system which utilizes pattern recognition to gain access to protected resources. Others have used patterns consisting of human faces, elements in the periodic table and even ingredients to cook a meal. However, displays on some devices can not accommodate such a complex array of items within a convenient time frame. My system can be used on a cell phone or a computer without compromising security or time to access a resource.

The inventions cited in prior art are limited by the following disadvantages:

a) the authorized user must recall a specific dedicated PIN, or progression of PINs, of unchangeable length for each different protected resource. This is a formidable task for any authorized user, and highly impractical for maintaining the intended level of security.

b) said prior art provides no means for changing PIN code length to adjust the level of security on a transaction-to-transaction basis.

c) said prior art suffers from excessive complexity causing authorized users to record PINs in computer memory or on paper reducing the intended level of security.

d) said prior art is conducive to the utilization of PINs that form familiar words, dates or numbers that are easily guessed by an unauthorized user such as a mother's maiden name, a birth date and street address respectively.

e) in said prior art, if a personalized PIN is compromised, and all personalized PINs are identical, all protected resources could be at risk if an unauthorized user gained access to a wallet or purse.

f) prior art requires the grantor of a protected resource to issue a PIN or progression of PINs to the authorized user of said protected resource.

DRAWING FIGURES

In the drawings, closely related figures have the same numbers but different alphabetic suffixes.

FIG. 3A demonstrates the first step in choosing a sequential matrix pattern: choosing a pattern within a standardized geometric matrix void of sequence.

FIG. 3B demonstrates the second step in choosing a sequential matrix pattern: adding a specific sequence to the matrix pattern chosen in FIG. 3A, forming a sequential matrix pattern.

FIG. 3C demonstrates a fully encoded geometric matrix with the sequential matrix pattern chosen in FIG. 3B highlighted with parenthesis.

FIG. 3D shows the fully encoded geometric matrix without the parenthesis.

FIG. 4A shows the fully encoded geometric matrix with a second transaction specific PIN encoded with the sequential matrix pattern chosen in FIG. 3B.

FIG. 4B shows the fully encoded geometric matrix with a third transaction specific PIN encoded with the sequential matrix pattern chosen in FIG. 3B.

FIG. 4C shows the fully encoded geometric matrix with a forth transaction specific PIN encoded with the sequential matrix pattern chosen in FIG. 3B.

FIG. 5A demonstrates the first step in choosing a sequential matrix pattern within a twenty-five position geometric matrix: choosing a pattern within a standardized geometric matrix void of sequence.

FIG. 5B demonstrates the second step in choosing a sequential matrix pattern within a twenty-five position geometric matrix: adding a specific sequence to the matrix pattern chosen in FIG. 5A, forming a sequential matrix pattern. Also, the addition of a matrix position that communicates PIN length to an authorized user is indicated by "#".

Figures 5C, 5D:
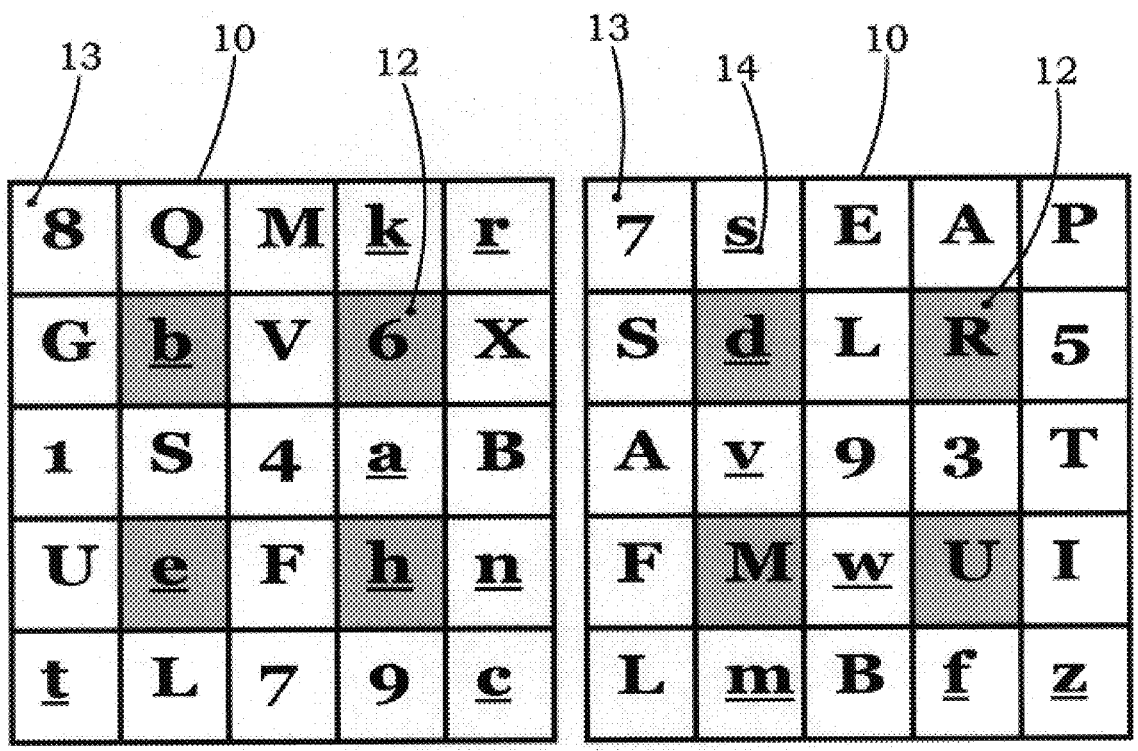

FIG. 5C shows a fully encoded geometric matrix with a passcode encoded within the chosen sequential pattern.

FIG. 5D shows a fully encoded geometric matrix with a password encoded within the chosen sequential pattern.

Figure 6:
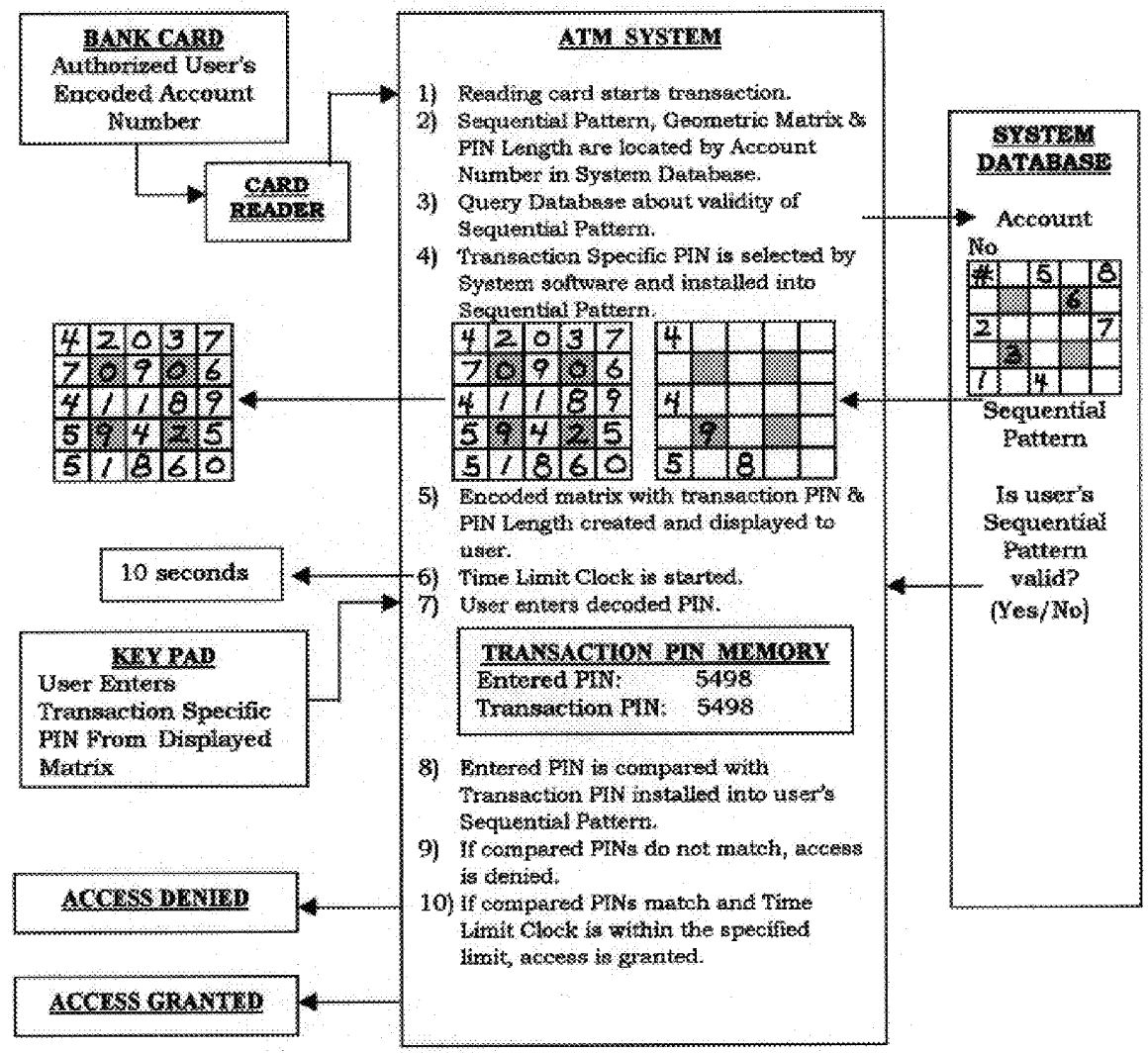

FIG. 6 shows a diagram of the preferred embodiment of my invention.

Reference Numerals in Drawing

10 Geometric matrix
11 Matrix square
12 Shaded reference matrix square
13 Matrix square indicating length of transaction specific PIN code
14 Character underlined indication lower case character

Description of FIGS. 1 to 5 (Functional Overview)

My invention is a method that verifies the identity of an authorized user of a protected resource that requires the use of a Personal Identification Number (PIN), Password, or Passcode to gain access to said resource. For brevity, I shall refer collectively to PIN, Password and Passcode as "PIN", and also, collectively to any computer based network(s) and associated databases as "System(s)".

Figure 1:
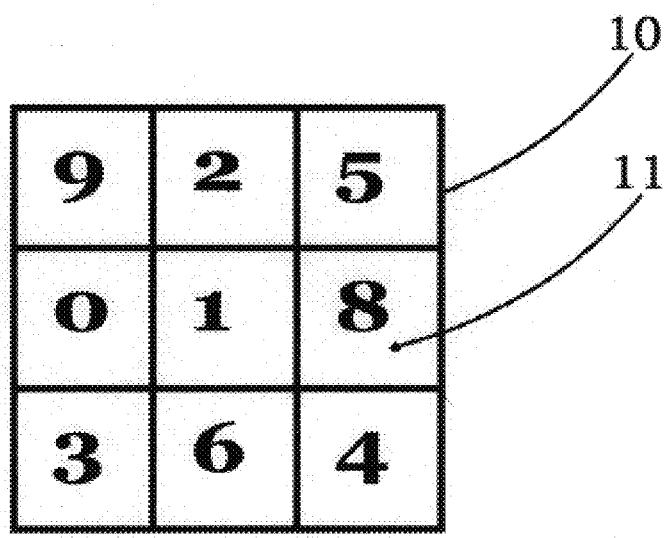
FIG. 1 shows a nine position geometric matrix in the shape of a square with an encoded transaction specific PIN.
Figure 2:
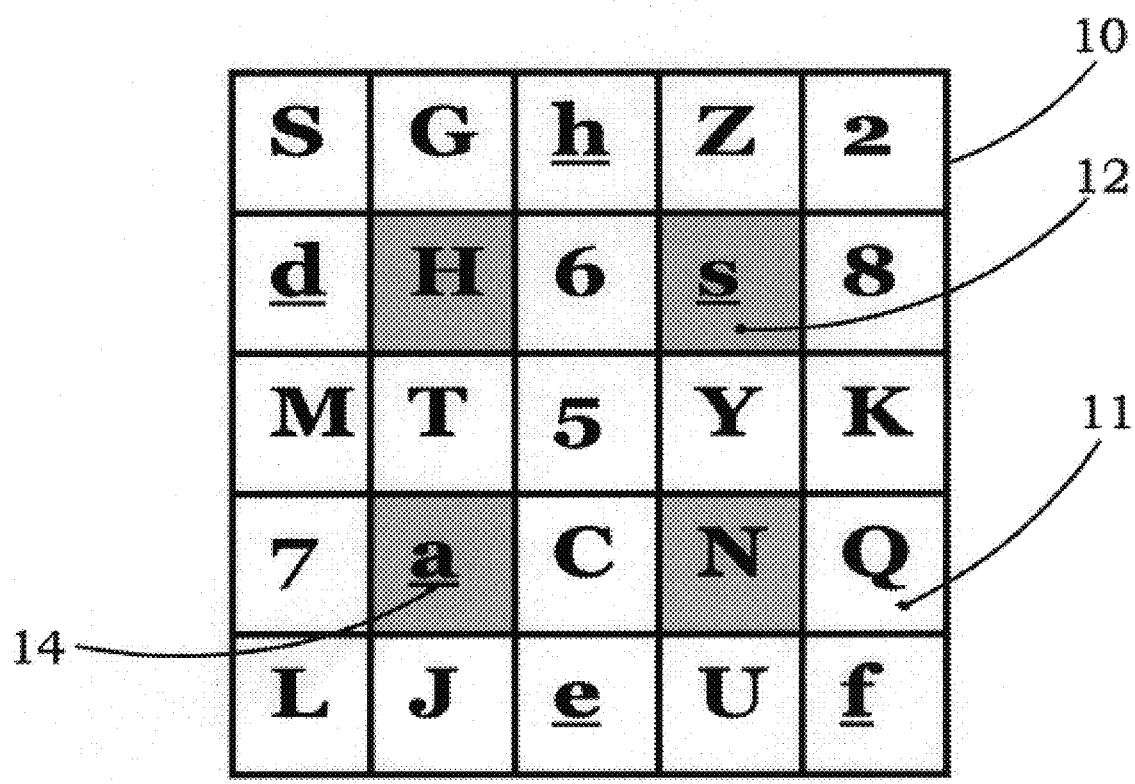
FIG. 2 shows a twenty-five position geometric matrix in the shape of a square with an encoded PIN, password or passcode. This geometric matrix contains four shaded matrix positions to serve as reference points to aid an authorized user in locating their secret sequential matrix pattern.

When a PIN protected transaction is initiated by a user, the Service Provider System (System) displays a standardized geometric matrix to said user with all matrix positions filled with random alpha and/or numeric characters (FIG. 1 or FIG. 2). Within the displayed geometric matrix, a PIN valid only for the specific transaction in progress, is encoded within the authorized user's personally chosen secret sequential matrix pattern. The user must recall their secret sequential matrix pattern and corresponding PIN length matrix position located within the displayed geometric matrix in order to decode the transaction specific PIN. Once decoded, said user must enter the transaction specific PIN into the System within a specified time limit. If the PIN entered by the user matches the transaction specific PIN encoded by the System software, and also held in System memory, the user is granted access to the service. If the PINs do not match, or the time limit has expired, user access is denied. All secret sequential matrix patterns and corresponding PIN length matrix positions chosen by all authorized users of the System are resident in the System's highly secure central database.

When a user initiates a second transaction, the transaction specific PIN is randomly changed by the System software and the resulting corresponding PIN length appropriately communicated, but the user's secret sequential matrix pattern remains constant and unchanged. Each time the user initiates a transaction, the transaction specific PIN is different and valid only for that specific transaction in progress. For additional security, a time limit is imposed from the time the geometric matrix is first displayed until the full transaction specific PIN is entered into the System by the user. In this way, unauthorized users are discouraged from trial and error techniques of PIN identification through repeated entry.

Therefore, by use of my invention, it will no longer be necessary to issue a permanent PIN, password or passcode to an authorized user of a PIN protected resource. Instead, the authorized user's secret sequential matrix pattern, as recalled from System database by System software, will encode the transaction specific PIN within the appropriate standardized geometric matrix. An authorized user only needs to recall their secret sequential matrix pattern and corresponding PIN length matrix position, obtain the transaction specific PIN within the specified time limit, and enter said transaction specific PIN into the System. It should be emphasized that a user only needs to recall one sequential matrix pattern to gain access to a plurality of PIN protected resources which subscribe to this system. Also, the transaction specific PINs are always changing with each and every subsequent transaction greatly increasing the overall security of the System.

The System may consists of a centralized computer database, within a network (intranet or internet) environment, that contains the personally chosen secret sequential matrix patterns of a plurality of authorized users. The secret sequential matrix patterns are chosen by said authorized users within the appropriate standardized geometric matrix of defined size and shape determined by application requirements and the level of security desired by System management. For example, a Credit Card PIN, which is presently standardized at four numbers, may require a minimum security geometric matrix consisting of only nine positions in the shape of a square (FIG. 1). On the other hand, a twenty-five position, high security, geometric matrix in the shape of a square may be required to accommodate a PIN, password or passcode consisting of eight or more characters (FIG. 2). The number of positions in the geometric matrix need only be standardized to accommodate the character length of the PIN, password or passcode, to achieve the desired intended level of security, and for user reference in recalling their personal sequential pattern.

Choosing a Sequential Pattern

A sequential matrix pattern within a geometric matrix is defined as a pattern that is not only matrix position specific, but also matrix sequence specific. For example, a typical authorized user would choose a four position sequential matrix pattern within a standardized, nine position, square geometric matrix as follows:
1. First, choose a specific pattern within the standardized geometric matrix (FIG. 3A).
2. Second, select a specific sequence within the chosen matrix pattern (FIG. 3B).
3. Memorize the chosen sequential matrix pattern within the standardized geometric matrix so said pattern can be recalled from an encoded geometric matrix where all matrix positions are filled with random characters or numbers.

FIG. 3C demonstrates how a fully encoded geometric matrix would looks to an authorized user with knowledge of the secret sequential matrix pattern. FIG. 3D demonstrates how the same geometric matrix described in FIG. 3C would look to an unauthorized user with no knowledge of the authorized user's secret sequential matrix pattern; just a set of numbers containing no specific information.

First, a user must choose a specific pattern within the geometric matrix as seen in FIG. 3A and indicated by the matrix squares marked by an "X". Next, a user must select a specific sequence within that chosen pattern as indicated by the ascending numerals and arrows in FIG. 3B. By following the numerals in ascending numerical order within the chosen matrix pattern, a user's selected sequential matrix pattern can be observed. This is the user's secret sequential matrix pattern known only by that specific user and the System's central database.

Using a Sequential Pattern

With knowledge of a secret sequential matrix pattern, an authorized user can easily recall said sequential matrix pattern and decode the transaction specific PIN as indicated by the numerals within parenthesis in FIG. 3C. Only the fully encoded standardized geometric matrix is presented or displayed to a user for decoding. An unauthorized user, without knowledge of an authorized user's sequential matrix pattern, only sees a random array of numerals or characters as seen in FIG. 3D, and therefore, can not decode the transaction specific PIN. On the other hand, an authorized user can easily decode any transaction specific PIN within the specified time limit by recalling their secret sequential matrix pattern within the displayed standardized geometric matrix. Using the secret sequential matrix pattern chosen in FIGS. 3A and 3B, other subsequent transaction specific PINs encoded in FIGS. 4A, 4B and 4C are easily decoded: "5632", "8793" and "3810" respectively. This demonstrates that by recalling only a single sequential matrix pattern, an authorized user can recall an unlimited number of transaction specific PINs, even PINs that have not been used for years.

With respect to a twenty-five position geometric matrix in the shape of a square, a sequential matrix pattern within this geometric matrix can accommodate both the existing four numeral credit card PINs and the more complex passwords and passcodes which usually consist of a minimum of eight characters. A twenty-five position geometric matrix is much more secure than the nine position counterpart, but requires the user to recall a more complex sequential pattern. However, the additional level of security attained by the twenty-five position matrix is substantial and justifies the extra effort in recalling a more complex sequential matrix pattern plus another matrix position to indicate PIN length.

As in the nine position geometric matrix, the user must first choose a pattern within the standardized geometric matrix as demonstrated by FIG. 5A. The shaded areas within the matrix are only provided as reference points to aid the user in recalling their chosen secret sequential matrix pattern. For example, the pattern chosen in FIG. 5A is indicated by "Xs" in the appropriate geometric matrix positions. Next, in FIG. 5B, the matrix pattern selected in FIG. 5A is sequenced by the authorized user as indicated by the ascending numerals and arrows. Also, included in FIG. 5B, is a matrix position chosen by the authorized user and indicated by a "#" that is not part of the authorized user's secret sequential matrix pattern. This is a fixed matrix position recorded in system memory that informs the authorized user of the exact length of the PIN, password or passcode encoded within said user's secret sequential matrix pattern. FIG. 5C demonstrates an encoded eight position passcode, while FIG. 5D demonstrates an encoded seven position password. The inclusion of the fixed matrix position indicating PIN length would depend upon the application, desired level of security and intended versatility of the System. If no matrix position indicating PIN length is utilized by a System, all PINs encoded within the secret sequential matrix patterns of said System users would be set at a standard length. Therefore, the capability to change both the code and the associated code length with each and every transaction specific PIN, password or passcode greatly increases security of the system while simultaneously deterring fraud.

Using the sequential pattern chosen in FIG. 5B, the passcode and password encoded in FIGS. 5C and 5D are "t1e7M6Br" and "LAMBERT" respectively.

Operation of Preferred Embodiment: FIG. 6

The following is to be considered one of many typical embodiments of my invention and is presented here only to serve as an example of how my invention would identify and verify the authorized user of a PIN protected resource. My invention can be applied to many different systems that presently or potentially require PIN, password or passcode protection.

The embodiment described below is one of the most common systems available in the marketplace today: the Automated Teller Machine (ATM)/bank card system for remote financial transactions. Note: System-1 refers to the functional system of my invention.

1) When a user wishes to use an ATM system to execute a financial transaction or access account information, the user must first insert a bank card into the ATM card reader to initiate the transaction (FIG. 6, Item 1). The card contains the authorized user's account number and other necessary information encoded electronically or magnetically to help locate said authorized user in the System-1 database.
2) The card reader extracts and transfers the encoded data from the user's bank card into the ATM system where System-1 software relates the decoded account number to the authorized user's secret sequential matrix pattern, PIN length matrix position and standardized geometric matrix located within the System-1 database files (FIG. 6, Item 2).
3) Once the authorized user's account number is positively linked to a specific database file, the authorized user's secret sequential matrix pattern, PIN length matrix position and standardized geometric matrix are available to ATM system software.
4) The ATM system then queries the System-1 database as to the validity of the user's sequential matrix pattern and card status. If the secret sequential matrix pattern and/or card are considered invalid, the process is terminated and the card may be rendered unusable by ATM system software. If the user's secret sequential matrix pattern and bank card are considered valid, System-1 software proceeds with the authorized user identification verification process (FIG. 6, Item 3).
5) A transaction specific PIN is randomly chosen by the System-1 software and installed into the authorized user's secret sequential matrix pattern within the appropriate standardized geometric matrix obtained from the System-1 database (FIG. 6, Item 4). The PIN length is calculated and the resultant character length numerically displayed in the authorized user's corresponding matrix position (FIG. 6, Item 5).
6) The transaction specific PIN is recorded in ATM and System-1 memory (FIG. 6, Item 7).
7) All vacant geometric matrix positions are filled with numerals (characters if appropriate). The fully encoded geometric matrix, with all matrix positions filled, is then displayed to the user (FIG. 6, Item 5).
8) The time limit clock is reset to "10.0" seconds (FIG. 6, Item 6).
9) The user recalls their secret sequential matrix pattern and PIN length matrix position. From the fully encoded displayed geometric matrix, said user decodes the transaction specific PIN by following said secret sequential matrix pattern and obtaining the PIN numerals in the predetermined order not exceeding the character length displayed in the PIN length matrix position.
10) The user enters the decoded transaction specific PIN into the ATM system via an ATM keypad (FIG. 6, Item 7).
11) The ATM system software compares the transaction specific PIN entered by the user with the transaction specific PIN resident in ATM system memory. If the PINs match exactly, and if the time limit clock has not timed out at 0.0 seconds, access to the PIN protected resource is granted (FIG. 6, Item 10). If the PINs do not match, or the time limit clock has timed out, access is denied and the card is returned to the user (FIG. 6, Item 9).
12) The user may subsequently reinitiate a second transaction, but the transaction specific PIN will be different. Upon several consecutive unsuccessful attempts to decode a transaction specific PIN, the user's card may be rendered unusable and/or confiscated if the entered transaction specific PIN is incorrect.

Ramifications and Scope of Invention

My invention is a System that eliminates permanent or dedicated credit card PIN codes, computer passwords or passcodes issued to an authorized user, by a grantor, for the purpose of gaining access to a protected resource. Instead of a user having to recall a plurality of access codes, with my invention a user only needs to recall a single secret sequential matrix pattern. When a transaction is initiated by a user, a standardized geometric matrix filled with random characters is displayed to said user. In order to obtain the encoded transaction specific or temporary access code from the displayed matrix, the user must recall their secret sequential matrix pattern and corresponding PIN length matrix position. The access code resides within said secret sequential matrix pattern that is also contained within a standardized geometric matrix, like a small box within a larger box. Once the code is obtained or decoded, a user enters that code into the System where said entered code is compared to the transaction specific code held in memory. If the two codes are identical, access is granted and the transaction is allowed to proceed. If the codes do not match, access is denied and the user must initiate a second transaction and decode a different transaction specific code from the displayed geometric matrix in order to gain access to the resource. All authorized user secret sequential matrix patterns are stored in a central database for System recall when a user initiates a transaction with a credit card or user log-on name. Since said transaction codes change in content and may change in length with each different transaction, and are valid for a limited time period (approximately 10 seconds), system security is greatly increased and user identification verification highly validated.

Although the descriptions above contain many specificities, these should not be construed as limiting the scope of my invention, but as merely providing illustrations of some of the presently preferred embodiments. Thus the scope of this invention should be determined by the appended claims and their legal equivalents, rather than by the examples provided.

I claim:

1. A method of verifying the identification of an authorized user of a set of protected resources within an employed system during a transaction with any singular set member by requiring said authorized user to recall a single secret sequential matrix pattern located within a standardized geometric matrix, and using said recalled secret sequential matrix pattern to decode a random transaction specific access code located within said standardized geometric matrix for the purpose of gaining access to any singular member of said set of protected resources, whereby:

- a) a single secret sequential matrix pattern is chosen within the standardized geometric matrix by the authorized user of specified length designated by the system in order to provide an adequate level of security for all members of the set of protected system resources;
- b) a length adjusting means of the transaction specific access code within the authorized user's secret sequential matrix pattern is provided on a transaction to transaction basis;
- c) a matrix position, not associated with the authorized user's secret sequential matrix pattern, is chosen by the authorized user to communicate the transaction specific access code length chosen by the system;
- d) a means is provided to store and recall a plurality of secret sequential matrix patterns and corresponding code length matrix positions within the standardized geometric matrix by the system;
- e) a means is provided to change the characters displayed within the standardized geometric matrix from transaction-to-transaction by the system;
- f) the transaction specific access code located within the authorized user's secret sequential matrix pattern is randomly selected by the system, and not related to any fixed sequence of events;
- g) a means is employed that is capable of receiving and processing account identification data from a potential authorized user for the purpose of initial and preliminary identification in the form of direct data input from a keyboard, a credit card magnetic strip, a smart card, a biometric scan or any other form of potential authorized user identification data input, and can relate said identification data input to the authorized user's secret sequential matrix pattern and corresponding code length matrix position within the standardized geometric matrix stored within the system memory;
- h) a means is employed that is capable of generating the random transaction specific access code within the authorized user's secret sequential matrix pattern on a transaction to transaction basis, and whereby said transaction specific code is stored in a system memory location;
- i) a means is employed that can calculate the transaction specific code length for a particular transaction and place the results of that calculation in the authorized user's secret matrix position dedicated to code length, and where by results of said calculation are recorded in a system memory location;
- j) a means is employed that is capable of displaying the geometric matrix containing the transaction specific code within the authorized user's secret sequential matrix pattern along with other matrix characters to a potential authorized user, and subsequently transmitting said user sequential input of the decoded transaction specific code into the system for verification;
- k) a means is employed that can compare a user's decoded and entered input and the corresponding transaction specific code stored in system memory and allow the transaction to proceed if the two codes are exactly identical in character sequence and length, or terminate the transaction if the codes are not exactly identical;
- l) a means is employed that can deny access to a user if a specific number of incorrect code input attempts are initiated by said user.

2. The method of claim 1, wherein the system is computer based.

3. The method of claim 1 comprising the following steps:

- a) initiation of a transaction within a system of protected resources upon receiving a user's account identification data;
- b) system relates user's account identification data to the authorized user's secret sequential matrix pattern and corresponding code length matrix position within a standardized matrix;
- c) system generates a random transaction specific access code and places said random access code into the authorized user's secret sequential matrix pattern by placing the first character of said random access code into the first position of the authorized user's secret sequential pattern, and whereby subsequent random access code characters are placed into said authorized user's secret sequential pattern in ascending sequential order;
- d) system calculates the length of the transaction specific random access code and places the result of said calculation into the authorized user's matrix position corresponding to access code length;
- e) system stores the transaction specific random access code into system memory;
- f) system fills all remaining vacant matrix positions within the standardized geometric matrix with random characters;
- g) the completely filled standardized geometric matrix is displayed to the user;
- h) a time out clock is started;
- i) the user recalls the authorized user's secret sequential matrix pattern and corresponding code length matrix position and decodes the transaction specific random access code from the displayed geometric matrix;
- j) user enters the decoded transaction specific access code into the system before the time out clock reaches end point;
- k) if the transaction specific access code entered by the user matches the transaction specific access code in system memory, access to the protected resource is granted;
- l) if the entered transaction specific access code entered by the user does not match the transaction specific access code in system memory, or the time out clock has reached end point, access is denied;
- m) if a second attempt is initiated by the user, a different random transaction specific access code will be generated by the system and installed into the authorized user's secret sequential pattern, and the length of said different access code may also change.

* * * * *